United States Patent
Chuang (10) Patent No.: US 6,545,804 B2
(45) Date of Patent: Apr. 8, 2003

(54) PROJECTION DISPLAY WITH TWO REFLECTIVE LIGHT VALVES

(75) Inventor: Fu-Ming Chuang, Hsin-Chu Hsien (TW)

(73) Assignee: Prokia Technology Co., Ltd., Tainan Hsien (TW)

( * ) Notice: Subject to any disclaimer, the term of this patent is extended or adjusted under 35 U.S.C. 154(b) by 0 days.

(21) Appl. No.: 09/880,663

(22) Filed: Jun. 13, 2001

(65) Prior Publication Data

US 2002/0191289 A1 Dec. 19, 2002

(51) Int. Cl.[7] .................................................. G02B 5/30
(52) U.S. Cl. ...................... 359/495; 359/502; 359/246; 353/20; 348/742
(58) Field of Search ............................... 389/246, 495, 389/502; 353/20; 348/742

(56) References Cited

U.S. PATENT DOCUMENTS 4,425,028 A * 1/1984 Gagnon et al. ............. 359/246
5,565,933 A * 10/1996 Reinsch ...................... 348/742

* cited by examiner

Primary Examiner—Audrey Chang
Assistant Examiner—Craig Curtis
(74) Attorney, Agent, or Firm—Trop, Pruner & Hu, P.C.

(57) ABSTRACT

In a projection display that includes a polarization beam splitter prism and two reflective light valves, each of a pair of dichroic beam splitters is disposed between the polarization beam splitter prism and a respective one of the reflective light valves. The arrangement as such ensures that only a minimal amount of light leakage components will reach a projection lens of the projection display so as to achieve optimum image quality.

6 Claims, 8 Drawing Sheets

PROJECTION DISPLAY WITH TWO REFLECTIVE LIGHT VALVES

BACKGROUND OF THE INVENTION

1. Field of the Invention

The invention relates to a projection display, more particularly to a projection display with two reflective light valves.

2. Description of the Related Art

In a conventional projection display, primary color components, such as red, green and blue color components, are processed before projecting the same so as to form an image on a projection screen. During the processing of light, the issue of light leakage must be addressed in order to achieve optimum image quality.

Figure 1:
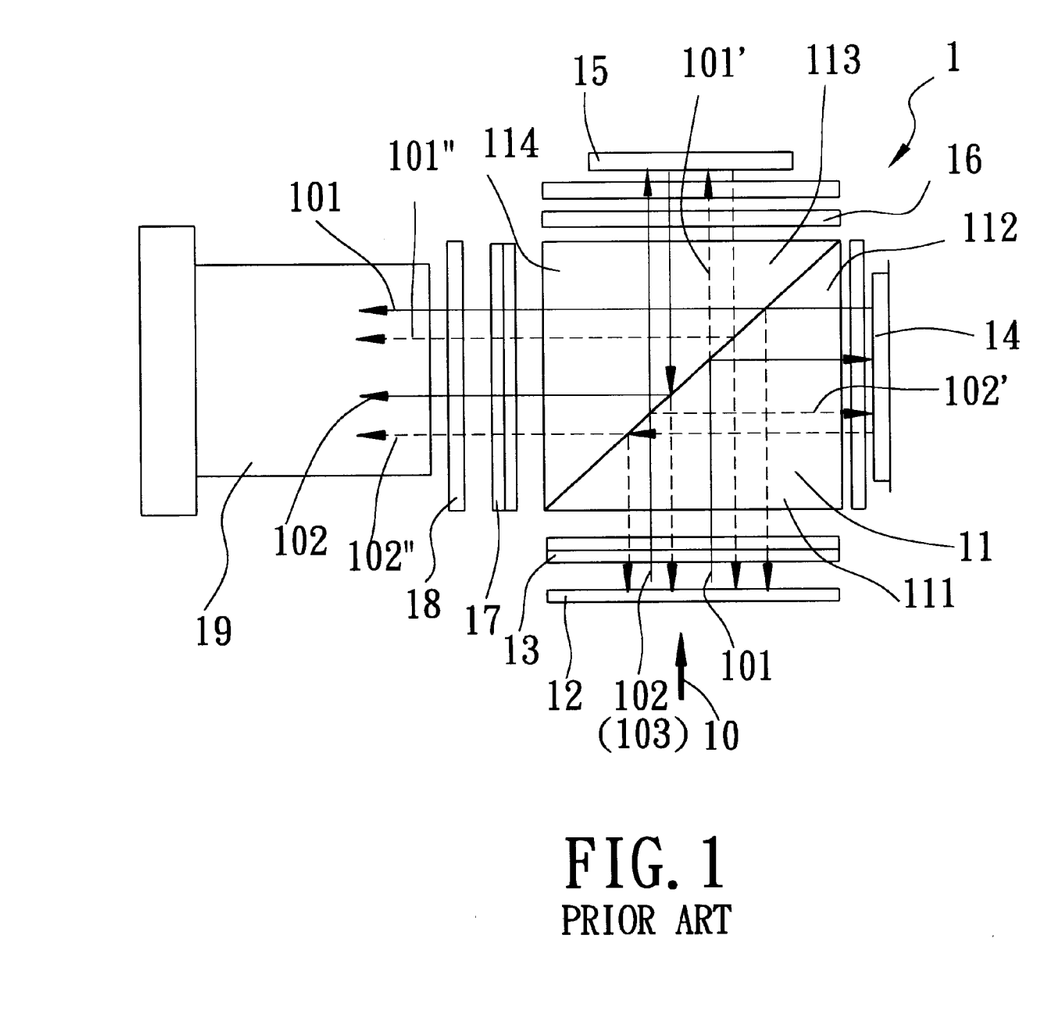
FIG. 1 is a schematic view of a conventional projection display with two reflective light valves.

Referring to FIG. 1, a conventional projection display 1 is shown to comprise a polarization beam splitter prism 11 which reflects S-polarization light in a transverse direction and which allows P-polarization light to pass directly therethrough. The polarization beam splitter prism 11 has a light input side 111, a first split-light side 112 adjacent to the light input side 111, a second split-light side 113 opposite to the light input side 111, and a light output side 114 opposite to the first split-light side 112. A P-state polarizer 12 is disposed adjacent to the light input side 111, allows P-polarization light to pass directly therethrough, and absorbs S-polarization light. A first light polarization selector 13 is disposed between the P-state polarizer 12 and the light input side 111, and converts the polarization state of red light that passes therethrough. A first reflective light valve 14 is disposed adjacent to the first split-light side 112, whereas a second reflective light valve 15 is disposed adjacent to the second split-light side 113. A color switch 16 is disposed between the second split-light side 113 and the second reflective light valve 15, and allows color components to pass therethrough in accordance with a predetermined color sequence. A second light polarization selector 17 is disposed adjacent to the light output side 114. An S-state polarizer 18 is disposed adjacent to one side of the second light polarization selector 17 opposite to the light output side 114, and prevents P-polarization light from passing therethrough. A projection lens 19 receives the light that passes through the S-state polarizer 18. When the first and second reflective light valves 14, 15 are in an active (ON) state, they modulate and convert the polarization state of light that is incident thereon, and reflect the modulated light in an opposite direction. In the following paragraphs, the operation of the conventional projection display 1 will be described in greater detail with the first and second reflective light valves 14, 15 in the active (ON) state. In addition, each of a pair of quarter wavelength plates is disposed between the polarization beam splitter prism 11 and a respective one of the first and second reflective light valves 14, 15 for enhancing the image contrast quality.

In use, when input white light 10 is provided to the P-state polarizer 12, only P-polarization first, second and third color components 101, 102, 103 (such as red, blue and green color components) will pass therethrough and reach the first light polarization selector 13. The first light polarization selector 13 changes the polarization state of the first color component 101 to S-polarization, and maintains the polarization state of the second and third color components 102, 103 at P-polarization. When the polarization beam splitter prism 11 receives the first, second and third color components 101, 102, 103 from the first light polarization selector 13, the S-polarization first color component 101 will be reflected toward the first reflective light valve 14, whereas the P-polarization second and third color components 102, 103 will be allowed to pass directly through the polarization beam splitter prism 11. The second and third color components 102, 103 from the polarization beam splitter prism 11 will be controlled by the color switch 16 so as to pass sequentially therethrough and reach the second reflective light valve 15. Because the paths of the second and third color components 102, 103 and the processing procedure therefor are essentially the same, processing of the third color component 103 will not be described herein for the sake of brevity.

When the first and second reflective light valves 14, 15 are in the active (ON) state, the S-polarization first color component 101 will be modulated by the first reflective light valve 14, and the polarization state of the first color component 101 will be changed to P-polarization. The P-polarization first color component 101 will then be reflected by the first reflective light valve 14 back to the polarization beam splitter prism 11, and will be allowed by the polarization beam splitter prism 11 to pass directly therethrough so as to reach the second light polarization selector 17. The second light polarization selector 17 will convert the polarization state of the P-polarization first color component 101 to S-polarization, and the S-polarization first color component 101 will pass through the S-state polarizer 18 before reaching the projection lens 19 for projecting the same on a projection screen (not shown). On the other hand, the P-polarization second color component 102 will be modulated by the second reflective light valve 15, and the polarization state of the P-polarization second color component 102 will be changed to S-polarization. The S-polarization second color component 102 will then be reflected by the second reflective light valve 15 back to the polarization beam splitter prism 11, and will be further reflected by the polarization beam splitter prism 11 to pass in sequence through the second light polarization selector 17 and the S-state polarizer 18 so as to reach the projection lens 19. When the second color component 102 is projected by the projection lens 19, it cooperates with the first color component 101 to form an image on the projection screen (not shown).

In the aforesaid conventional projection display 1, white light is separated into color components, which are modulated by reflective light valves and which are subsequently recombined to form images on a projection screen. However, due to current manufacturing constraints and the characteristics of polarized light, P-polarization light will be unable to pass through the polarization beam splitter prism with very high transmission efficiency. As such, when P-polarization light passes directly through the polarization beam splitter prism, a small portion of the P-polarization light will be reflected to form light leakage components, as indicated by the phantom lines in FIG. 1. While a portion of the S-polarization light will pass through the polarization beam splitter prism to result in corresponding light leakage components, the amount of the light leakage components attributed to the S-polarization light is much less than that attributed to the P-polarization light. In the conventional projection display 1 of FIG. 1, it is assumed that 10% of the P-polarization light will be reflected by the polarization beam splitter prism 11 to form light leakage components, and that 2% of the S-polarization light will be allowed by the polarization beam splitter prism 11 to pass directly therethrough to form light leakage components. Therefore, when the S-polarization first color component 101 is reflected by the polarization beam splitter prism 11, about 2% of the first color component 101 will form a first light leakage component 101' that passes directly through the polarization beam splitter prism 11 and that reaches the second reflective light valve 15. The second reflective light valve 15 will change the polarization state of the first light leakage component 101' to P-polarization, and the P-polarization first light leakage component 101' will be reflected back to the polarization beam splitter prism 11. At this time, about 10% of the P-polarization first light leakage component 101' will be reflected by the polarization beam splitter prism 11 to form another light leakage component 101" that passes through the second light polarization selector 17 and the S-state polarizer 18 before reaching the projection lens 19. Thus, the amount of light leakage component received by the projection lens 19 and attributed to the first color component 101 is equal to 0.02×0.1 or 0.2%. Accordingly, when the P-polarization second color component 102 passes directly through the polarization beam splitter prism 11, about 10% of the second color component 102 will form a second light leakage component 102' that is reflected by the polarization beam splitter prism 11 and that reaches the first reflective light valve 14. The first reflective light valve 14 will change the polarization state of the second light leakage component 102' to S-polarization, and the S-polarization second light leakage component 102' will be reflected back to the polarization beam splitter prism 11. At this time, while about 98% of the S-polarization second light leakage component 102' will be reflected by the polarization beam splitter prism 11 toward the first light polarization selector 13, about 2% of the S-polarization second light leakage component 102' will be allowed by the polarization beam splitter prism 11 to pass directly therethrough to form yet another light leakage component 102" that passes through the second light polarization selector 17 and the S-state polarizer 18 before reaching the projection lens 19. Thus, the amount of light leakage component received by the projection lens 19 and attributed to the second color component 102 is equal to 0.02×0.1 or 0.2%. The large amount of light leakage components received by the projection lens 19 has a serious adverse affect on the image shown by the conventional projection display 1.

SUMMARY OF THE INVENTION

Therefore, the main object of the present invention is to provide a projection display of the type having two reflective light valves which can minimize the amount of light leakage components that reach a projection lens to achieve optimum image quality.

According to the present invention, a projection display comprises:

a polarization beam splitter prism having a light input side, a first split-light side adjacent to the light input side, a second split-light side opposite to the light input side, and a light output side opposite to the first split-light side, the polarization beam splitter prism allowing light that enters the light input side and that has a first polarization state to be reflected so as to pass through the first split-light side, and further allowing light that enters the light input side and that has a second polarization state to pass directly through the second split-light side;

a first light polarization selector disposed adjacent to the light input side, the first light polarization selector being adapted to receive an input light beam that contains first, second and third color components and to process the input light beam such that the first color component has a polarization state different from that of the second and third color components;

a projection lens disposed adjacent to the light output side;

a second light polarization selector disposed between the light output side and the projection lens, the second light polarization selector receiving light that exits the light output side and processing the light from the light output side such that the first, second and third color components thereof have the same polarization state prior to reaching the projection lens;

first and second reflective light valves disposed adjacent to the first and second split-light sides, respectively, the first reflective light valve being operable so as to modulate the first color component from the polarization beam splitter prism, the second reflective light valve being operable so as to modulate the second and third color components from the polarization beam splitter prism;

a first dichroic beam splitter disposed between the polarization beam splitter prism and the first reflective light valve for directing the first color component from the polarization beam splitter prism to the first reflective light valve, and for directing the first color component from the first reflective light valve back to the polarization beam splitter prism;

a second dichroic beam splitter disposed between the polarization beam splitter prism and the second reflective light valve for directing the second and third color components from the polarization beam splitter prism to the second reflective light valve, and for directing the second and third color components from the second reflective light valve back to the polarization beam splitter prism; and a color switch disposed between the polarization beam splitter prism and the second reflective light valve and operable so as to allow the color components to pass sequentially therethrough.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 2:
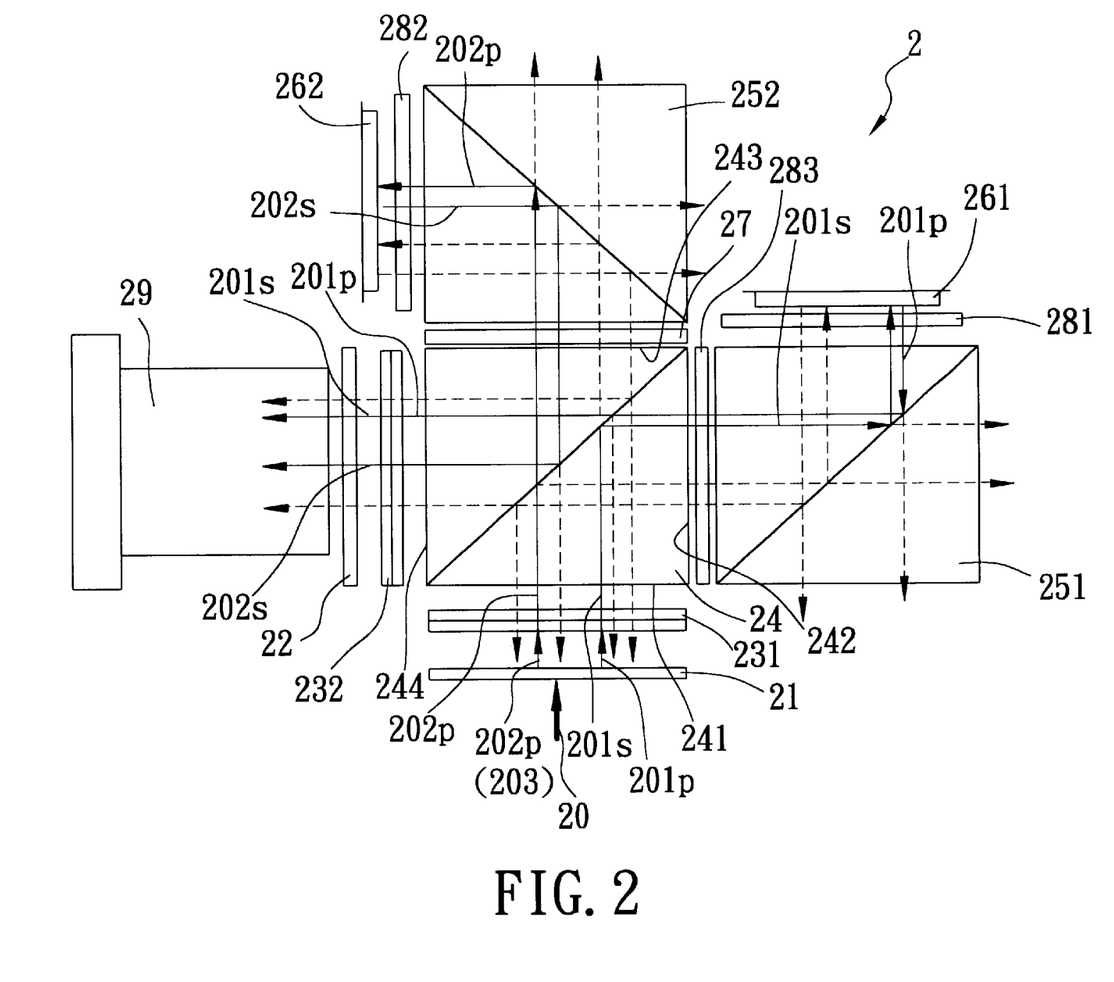
FIG. 2 is a schematic view of the first preferred embodiment of a projection display with two reflective light valves in accordance with this invention.

Referring to FIG. 2, the first preferred embodiment of a projection display 2 according to the present invention is shown to comprise a P-state first polarizer 21, an S-state second polarizer 22, a first light polarization selector 231, a second light polarization selector 232, a polarization beam splitter prism 24, a first dichroic beam splitter 251, a second dichroic beam splitter 252, a first reflective light valve 261, a second reflective light valve 262, a color switch 27, a first quarter wavelength plate 281, a second quarter wavelength plate 282, an optical path compensating plate 283, and a projection lens 29. The first polarizer 24 is disposed adjacent to a light input side 241 of the polarization beam splitter prism 24. The first light polarization selector 231 is disposed between the first polarizer 24 and the light input side 241. The first dichroic beam splitter 251 is disposed adjacent to a first split-light side 242 of the polarization beam splitter prism 24. The optical path compensating plate 283 is disposed between the first split-light side 242 and the first dichroic beam splitter 251. The second dichroic beam splitter 252 is disposed adjacent to a second split-light side 243 of the polarization beam splitter prism 24. The color switch 27 is disposed between the second split-light side 243 and the second dichroic beam splitter 252. The projection lens 29 is disposed adjacent to a light output side 244 of the polarization beam splitter prism 24. The second light polarization selector 232 is disposed between the light output side 244 and the projection lens 29. The second polarizer 22 is disposed between the second light polarization selector 232 and the projection lens 29. The first reflective light valve 261 is disposed adjacent to the first dichroic beam splitter 251. The first quarter wavelength plate 281 is disposed between the first dichroic beam splitter 251 and the first reflective light valve 261. The second reflective light valve 262 is disposed adjacent to the second dichroic beam splitter 252. The second quarter wavelength plate 282 is disposed between the second dichroic beam splitter 252 and the second reflective light valve 262. In the projection display 2 of this embodiment, an input light beam 20 is provided to the first polarizer 21. An output light beam is projected by the projection lens 29 to form an image on a projection screen. In use, the input light beam 20 is white light that can be separated into a first color component 201, such as a red color component, and second and third color components 202, 203, such as blue and green color components. The first color component 201 will be modulated by the first reflective light valve 261. Through the use of the color switch 27, the second and third color components 202, 203 will be modulated in sequence by the second reflective light valve 262. Because the paths of the second and third color components 202, 203 and the processing procedure therefor are essentially the same, processing of the third color component 203 will not be described herein for the sake of brevity.

In the first preferred embodiment, the first polarizer 21 allows P-polarization light to pass therethrough, and absorbs S-polarization light. The second polarizer 22 allows S-polarization light to pass therethrough, and absorbs P-polarization light. In the projection display of FIG. 2, the first polarizer 21 allows only P-polarization color components 201P, 202P to reach the polarization beam splitter prism 24. The second polarizer 22 allows only S-polarization color components 201S, 202S to reach the projection display 29.

Each of the first and second light polarization selectors 231, 232, such as the ColorSelect® filter products available from ColorLink Co., is used to convert the polarization state of a predetermined color component. In the first preferred embodiment, the first light polarization selector 231 is used to convert the P-polarization first color component 201P that passes therethrough into an S-polarization first color component 201S. The P-polarization state of the second color component 202P is maintained as the latter passes through the first light polarization selector 231. The second light polarization selector 232 is used to convert the polarization state of the P-polarization first color component 201P that passes therethrough back to the S-polarization. Likewise, the polarization state of the second color component 202S is maintained as the latter passes through the second light polarization selector 232.

The polarization beam splitter prism 24 reflects S-polarization light in a transverse direction, and allows P-polarization light to pass directly therethrough. Thus, when the S-polarization first color component 201S and the P-polarization second color component 201P are received by the polarization beam splitter prism 24 at the light input side 241 thereof from the first light polarization selector 231, the S-polarization first color component 201S will be reflected toward the first dichroic beam splitter 251, whereas the P-polarization second color component 202P will be allowed to reach the second dichroic beam splitter 252 via the color switch 27.

The color switch 27 is a product commercially available from ColorLink Co., and is operable so as to allow different colors of light, either solely or in combination, to pass therethrough in a predetermined color sequence. In this embodiment, the color switch 27 is operable so as to allow the different color components to pass sequentially therethrough.

The optical path compensating plate 283 is used to provide optical path compensation such that the path lengths traveled by the different color components in the projection display 2 of this invention can be maintained to be substantially equal. The optical path compensating plate 283 can be formed integrally with the first dichroic beam splitter 251.

Each of the first and second dichroic beam splitters 251, 252 of the projection display 2 is a rectangular prism having a color splitting layer that is formed from a stack of thin films having different refractive indices. By controlling the material, thickness and number of the films in the stack, light of a predetermined wavelength can be allowed to pass through or can be reflected by the color splitting layer. During manufacture, each of the first and second dichroic beam splitters 251, 252 can be formed by bonding together a pair of right-angled triangular prisms. In the embodiment of FIG. 2, the first dichroic beam splitter 251 reflects the S-polarization first color component 201S from the optical path compensating plate 283, and allows the second color component 202 to pass therethrough. The second dichroic beam splitter 252 reflects the P-polarization second color component 202P from the color switch 27, and allows the first color component 201 to pass therethrough.

The first and second quarter wavelength plates 281, 282 are provided in the projection display 2 for enhancing the image contrast quality in a known manner.

When the first and second reflective light valves 261, 262 are in an active (ON) state, each of the first and second reflective light valves 261, 262 processes a respective one of the first and second color components 201, 202 by modulating and changing the polarization state of the same, and by reflecting the modulated one of the first and second color components 201, 202. Particularly, the first reflective light valve 261 modulates the S-polarization first color component 201S received from the first quarter wavelength plate 281, and reflects the P-polarization first color component 201P back to the first quarter wavelength plate 281. The second reflective light valve 262 modulates the P-polarization second color component 202P received from the second quarter wavelength plate 282, and reflects the S-polarization second color component 202S back to the second quarter wavelength plate 282.

In use, after the P-polarization first color component 201P passes through the first polarizer 21, the polarization state thereof will be converted by the first light polarization selector 231 to result in the S-polarization first color component 201S. When the S-polarization first color component 201S reaches the polarization beam splitter prism 24, it will be reflected so as to pass through the optical path compensating plate 283 and reach the first dichroic beam splitter 251. At this time, the S-polarization first color component 201S will be reflected by the first dichroic beam splitter 251 to pass through the first quarter wavelength plate 281 and reach the first reflective light valve 261. The S-polarization first color component 201S will be modulated by the first reflective light valve 261 to result in the P-polarization first color component 201P that is reflected back to the first dichroic beam splitter 251 via the first quarter wavelength plate 281. The first dichroic beam splitter 251 reflects the P-polarization first color component 201P to pass through the optical path compensating plate 283 and reach the polarization beam splitter prism 24, and the polarization beam splitter prism 24 allows the P-polarization first color component 201P to pass directly therethrough and reach the second light polarization selector 232. The second light polarization selector 232 changes the polarization state of the P-polarization first color component 201P to S-polarization, and the S-polarization first color component 201S from the second light polarization selector 232 passes through the second polarizer 22 before reaching the projection lens 29.

On the other hand, after the P-polarization second color component 202P passes through the first polarizer 21 and the first light polarization selector 231 so as to reach the polarization beam splitter prism 24, it will be allowed by the polarization beam splitter prism 24 to pass directly therethrough so as to reach the second dichroic beam splitter 252 via the color switch 27. At this time, the P-polarization second color component 202P will be reflected by the second dichroic beam splitter 252 to pass through the second quarter wavelength plate 282 and reach the second reflective light valve 262. The P-polarization second color component 202P will be modulated by the second reflective light valve 262 to result in the S-polarization second color component 202S that is reflected back to the second dichroic beam splitter 252 via the second quarter wavelength plate 282. The second dichroic beam splitter 252 reflects the S-polarization second color component 202S to pass through the color switch 27 and reach the polarization beam splitter prism 24, and the polarization beam splitter prism 24 reflects the S-polarization second color component 202S to pass through the second light polarization selector 232 and the second polarizer 22 so as to reach the projection lens 29.

In practice, when polarized light passes through the polarization beam splitter prism 24 and the first and second dichroic beam splitters 251, 252, a small amount of light leakage components will be generated in view of the characteristics of the polarization beam splitter prism 24 and the first and second dichroic beam splitters 251, 252. In the present embodiment, when P-polarized light passes through the polarization beam splitter prism 24, about 10% thereof will form light leakage components, whereas when S-polarized light passes through the polarization beam splitter prism 24, about 1% thereof will form light leakage components.

The light leakage components attributed to the first color component 201 will now be described as follows: When the S-polarization first color component 201S reaches the polarization beam splitter prism 24, 99% thereof will be reflected toward the first dichroic beam splitter 251, whereas 1% thereof will be allowed to pass directly therethrough to form a first light leakage component that reaches the second dichroic beam splitter 252 via the color switch 27. Then, about 10% of the first light leakage component will be reflected by the second dichroic beam splitter 252 to form a second light leakage component that reaches the second reflective light valve 262 via the second quarter wavelength plate 282, whereas about 90% of the first light leakage component will form a third light leakage component that is allowed to pass directly through the second dichroic beam splitter prism 252 so as not to reach the projection lens 29. The polarization state of the second light leakage component will be converted by the second reflective light valve 262 to P-polarization, and the P-polarization second light leakage component will be reflected by the second reflective light valve 262 to pass through the second quarter wavelength plate 282 and reach the second dichroic beam splitter 252. About 10% of the P-polarization second light leakage component will be reflected by the second dichroic beam splitter 252 to form a fourth light leakage component that passes through the color switch 27 and reaches the polarization beam splitter prism 24, whereas about 90% of the P-polarization second light leakage component will form a fifth light leakage component that passes directly through the second dichroic beam splitter 252 so as not to reach the projection lens 29. About 90% of the fourth light leakage component forms a sixth light leakage component that passes directly through the polarization beam splitter prism 24 so as not to reach the projection lens 29. About 10% of the fourth light leakage component will be reflected by the polarization beam splitter prism 24 to form a seventh light leakage component that passes in sequence through the second light polarization selector 232 and the second polarizer 22 and that reaches the projection lens 29. The amount of the seventh light leakage component that reaches the projection lens 29 is 0.01×0.1×0.1×0.1 or 0.001%.

The light leakage components attributed to the second color component 202 will now be described as follows: When the P-polarization second color component 202P reaches the polarization beam splitter prism 24, about 90% thereof will be allowed to pass directly therethrough and reach the second dichroic beam splitter 252 via the color switch 27, whereas about 10% thereof will be reflected to form a first light leakage component that reaches the first dichroic beam splitter 251 via the optical path compensating plate 283. Then, about 90% of the first light leakage component will form a second light leakage component that is allowed to pass directly through the first dichroic beam splitter 251 so as not to reach the projection lens 29, whereas about 10% of the first light leakage component will be reflected by the first dichroic beam splitter 251 to form a third light leakage component that reaches the first reflective light valve 261 via the first quarter wavelength plate 281.

The polarization state of the third light leakage component will be converted by the first reflective light valve 261 to S-polarization, and the S-polarization third light leakage component will be reflected by the first reflective light valve 261 to pass through the first quarter wavelength plate 281 and reach the first dichroic beam splitter 251. About 10% of the S-polarization third light leakage component will be reflected by the first dichroic beam splitter 251 to form a fourth light leakage component that reaches the polarization beam splitter prism 24, whereas about 90% of the S-polarization third light leakage component will form a fifth light leakage component that passes directly through the first dichroic beam splitter 251 so as not to reach the projection lens 29. About 99% of the fourth light leakage component forms a sixth light leakage component that is reflected by the polarization beam splitter prism 24 so as not to reach the projection lens 29. About 1% of the fourth light leakage component will be allowed to pass through the polarization beam splitter prism 24 to form a seventh light leakage component that passes in sequence through the second light polarization selector 232 and the second polarizer 22 and that reaches the projection lens 29. The amount of the seventh light leakage component that reaches the projection lens 29 is 0.1×0.1×0.1×0.1 or 0.001%.

It has thus been shown that the amount of light leakage components that reach the projection lens 29 in the projection display 2 of this invention has been significantly reduced so as to achieve optimum image quality.

Figure 3:
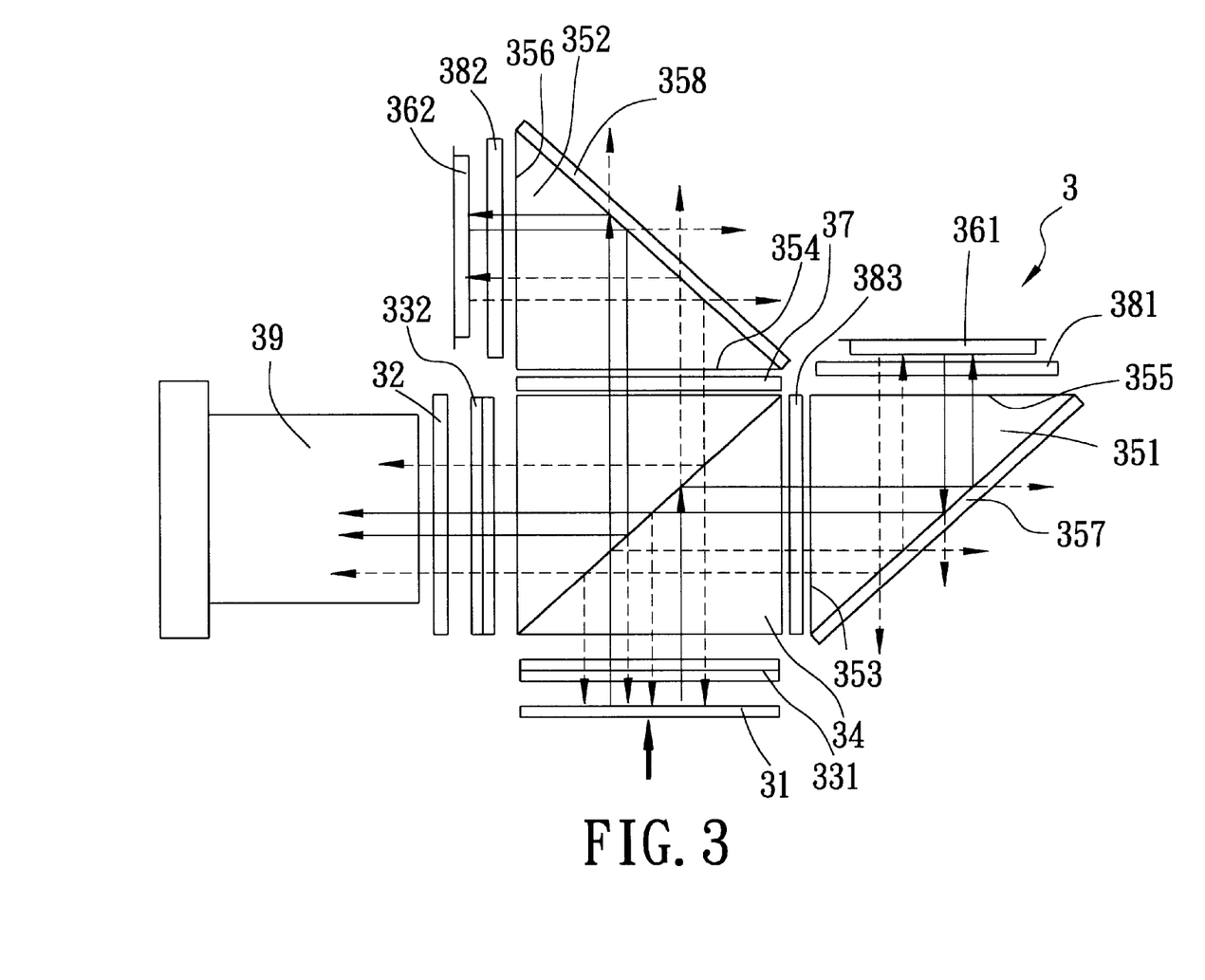
FIG. 3 is a schematic view of the second preferred embodiment of a projection display with two reflective light valves in accordance with this invention.

Referring to FIG. 3, the second preferred embodiment of a projection display 3 according to the present invention is shown to similarly comprise a first polarizer 31, a second polarizer 32, a first light polarization selector 331, a second light polarization selector 332, a polarization beam splitter prism 34, a first dichroic beam splitter 351, a second dichroic beam splitter 352, a first reflective light valve 361, a second reflective light valve 362, a color switch 37, a first quarter wavelength plate 381, a second quarter wavelength plate 382, an optical path compensating plate 383, and a projection lens 39. In this embodiment, each of the first and second dichroic beam splitters 351, 352 is formed as a right-angled triangular prism instead of the rectangular prism of the previous embodiment. The optical path compensating plate 383 is disposed between the polarization beam splitter prism 34 and a light input side 353 of the first dichroic beam splitter 351. The first reflective light valve 361 and the first quarter wavelength plate 381 are disposed adjacent to a light output side 355 of the first dichroic beam splitter 351 that is transverse to the light input side 353. The color switch 37 is disposed between the polarization beam splitter prism 34 and a light input side 354 of the second dichroic beam splitter 352. The second reflective light valve 362 and the second quarter wavelength plate 382 are disposed adjacent to a light output side 356 of the second dichroic beam splitter 352 that is transverse to the light input side 354. A dichroic color splitting film layer 357, 358 is formed on a hypotenuse side of each of the first and second dichroic beam splitters 351, 352. The characteristics of the dichroic color splitting film layers 357, 358 and the effects attributed thereto are similar to those of the color splitting layers of the first and second dichroic beam splitters of the projection display 2 of the previous embodiment.

Figure 4:
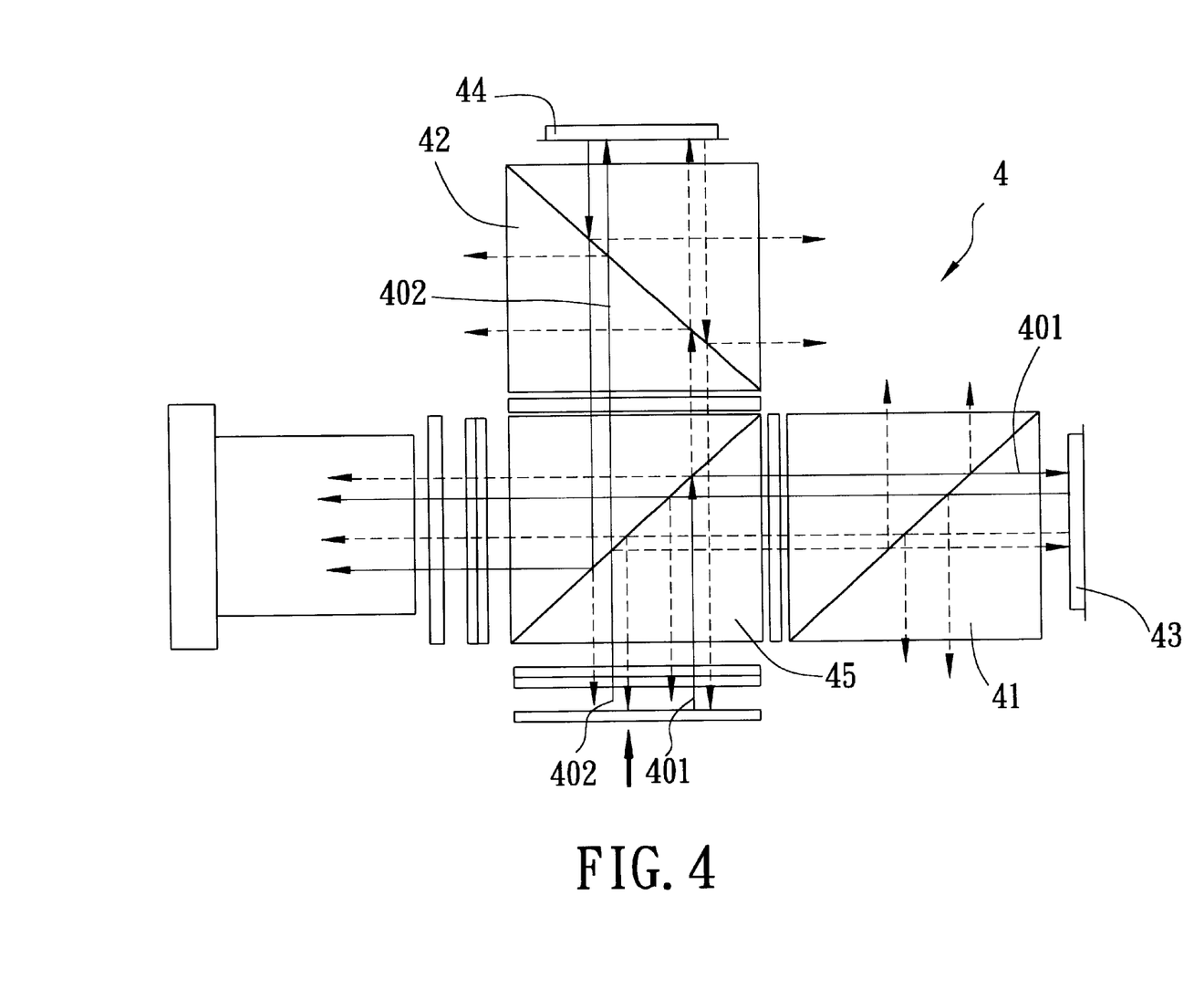
FIG. 4 is a schematic view of the third preferred embodiment of a projection display with two reflective light valves in accordance with this invention.

FIG. 4 illustrates the third preferred embodiment of a projection display 4 according to the present invention, which is a modification of the first preferred embodiment. Unlike the first preferred embodiment, the first dichroic beam splitter 41 allows the first color component 401 to pass therethrough, and reflects the second color component 402 in a transverse direction. The second dichroic beam splitter 42 allows the second color component 402 to pass therethrough, and reflects the first color component 401 in a transverse direction. The first reflective light valve 43 is disposed on one side of the first dichroic beam splitter 41 for modulating the first color component 401. The second reflective light valve 44 is disposed on one side of the second dichroic beam splitter 42 for modulating the second color component 402. In use, when the first color component 401 is reflected by the polarization beam splitter prism 45 toward the first dichroic beam splitter 41, the first color component 401 will pass through the first dichroic beam splitter 41 and will be modulated by the first reflective light valve 43. The light leakage components attributed to the first color component 401 as the latter passes through the first dichroic beam splitter 41 to and from the first reflective light valve 401 will be reflected by the first dichroic beam splitter 41 in transverse directions so as not to reach the projection lens. The light leakage component attributed to the first color component 401 as the latter is reflected by the polarization beam splitter prism 45 toward the first dichroic beam splitter 41 will pass directly through the polarization beam splitter prism 45 and reach the second dichroic beam splitter 42. At this time, a large portion of the light leakage component will be reflected in transverse directions by the second dichroic beam splitter 42, and only a small portion of the light leakage component will be received by the polarization beam splitter prism 45 and will be provided to the projection lens. Accordingly, when the second color component 402 passes directly through the polarization beam splitter prism 45 to reach the second dichroic beam splitter 42, the second color component 402 will pass through the second dichroic beam splitter 42 and will be modulated by the second reflective light valve 44. The light leakage components attributed to the second color component 402 as the latter passes through the second dichroic beam splitter 42 to and from the second reflective light valve 44 will be reflected by the second dichroic beam splitter 42 in transverse directions so as not to reach the projection lens. The light leakage component attributed to the second color component 402 as the latter passes directly through the polarization beam splitter prism 45 toward the second dichroic beam splitter 42 will be reflected by the polarization beam splitter prism 45 to reach the first dichroic beam splitter 41. At this time, a large portion of the light leakage component will be reflected in transverse directions by the first dichroic beam splitter 41, and only a small portion of the light leakage component will be received by the polarization beam splitter prism 45 and will be provided to the projection lens.

Figure 5:
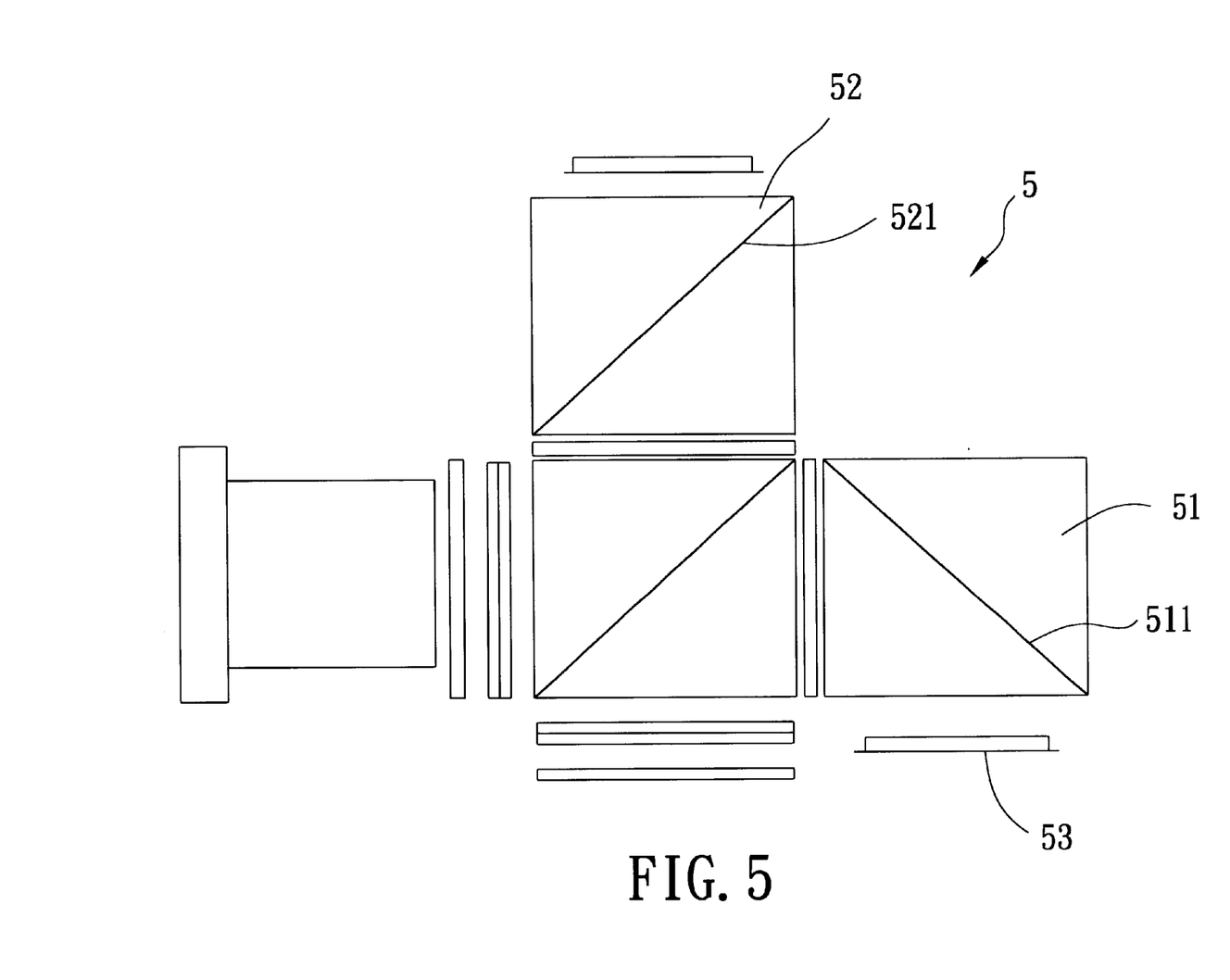
FIG. 5 is a schematic view of the fourth preferred embodiment of a projection display with two reflective light valves in accordance with this invention.

FIG. 5 illustrates the fourth preferred embodiment of a projection display 5 according to the present invention, which is a modification of the third preferred embodiment. In the present embodiment, the directions of the 45° inclinations of the color splitting layers 511, 521 of the first and second dichroic beam splitters 51, 52 are opposite to those of the dichroic beam splitters of the previous embodiment. In addition, the position of the first reflective light valve 53 with respect to the first dichroic beam splitter 51 is also different as compared to the arrangement in the third preferred embodiment. The effect of a relatively low amount of light leakage components reaching the projection lens is similarly achieved in the projection display 5 of the present embodiment.

Figure 6:
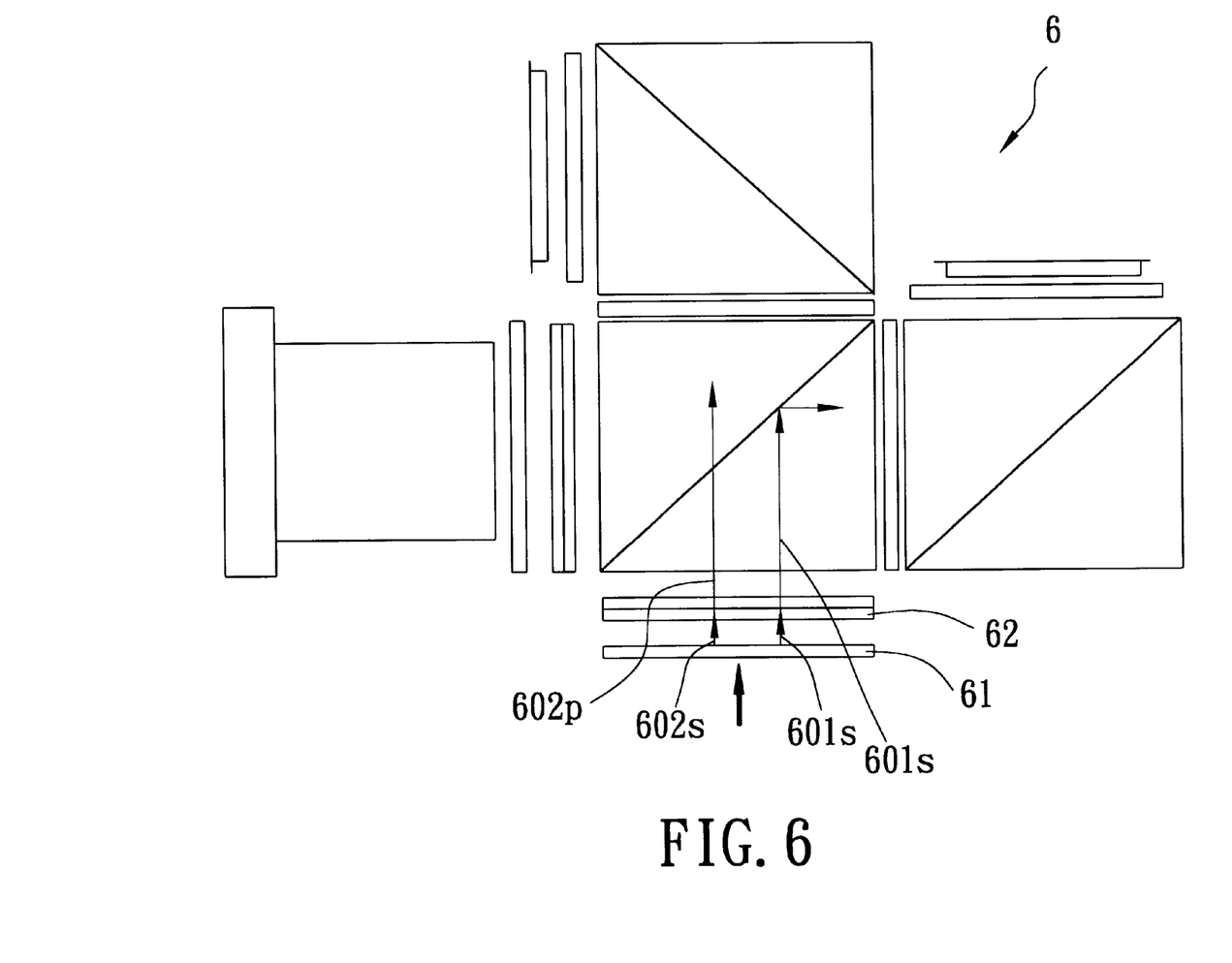
FIG. 6 is a schematic view of the fifth preferred embodiment of a projection display with two reflective light valves in accordance with this invention.

FIG. 6 illustrates the fifth preferred embodiment of a projection display 6 according to the present invention, which is a modification of the first preferred embodiment. In this embodiment, S-polarization light is inputted to the first polarizer 61, and the first polarizer 61 is an S-state polarizer that is configured to allow only S-polarization light to pass therethrough and to absorb P-polarization light. The first light polarization selector 62 is designed to convert the S-polarization second color component 602*s* into the P-polarization second color component 602*p*, and to maintain the polarization state of the S-polarization first color component 601*s*.

Figure 7:
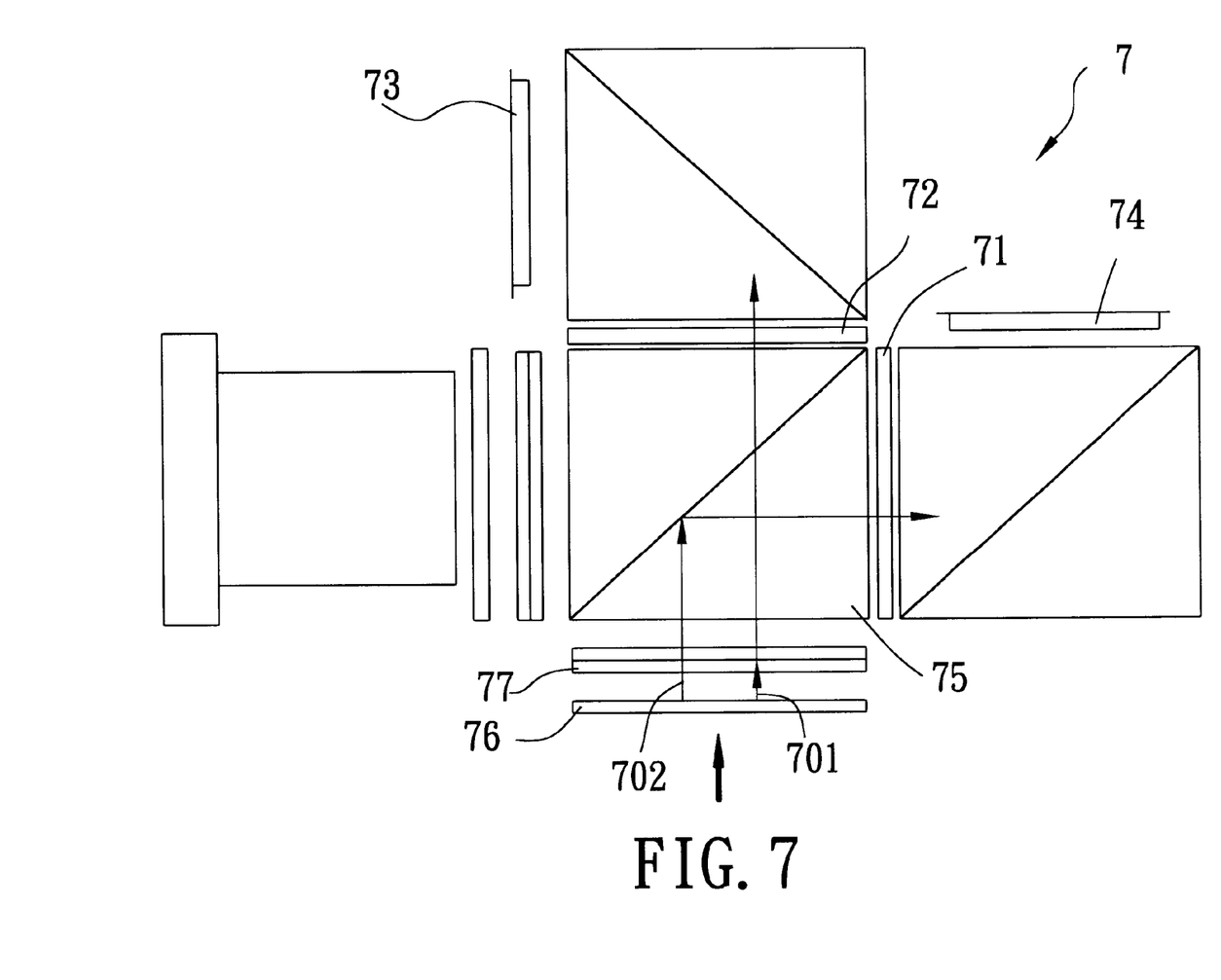
FIG. 7 is a schematic view of the sixth preferred embodiment of a projection display with two reflective light valves in accordance with this invention.

FIG. 7 illustrates the sixth preferred embodiment of a projection display 7 according to the present invention, which is a modification of the first preferred embodiment. As compared with the first preferred embodiment, the positions of the color switch 71 and the optical path compensating plate 72 are interchanged, and the positions of the first and second reflective light valves 73, 74 are interchanged. The first polarizer 76 and the first light polarization selector 77 are configured such that the first color component 701 has the P-polarization state and such that the second color component 702 has the S-polarization state upon reaching the polarization beam splitter prism 75. In use, the P-polarization first color component 701 passes directly through the polarization beam splitter prism 75 and the optical path compensating plate 72 before being modulated by the first reflective light valve 73. The S-polarization second color component 702 will be reflected by the polarization beam splitter prism 75 so as to pass through the color switch 71 before reaching the second reflective light valve 74.

Figure 8:
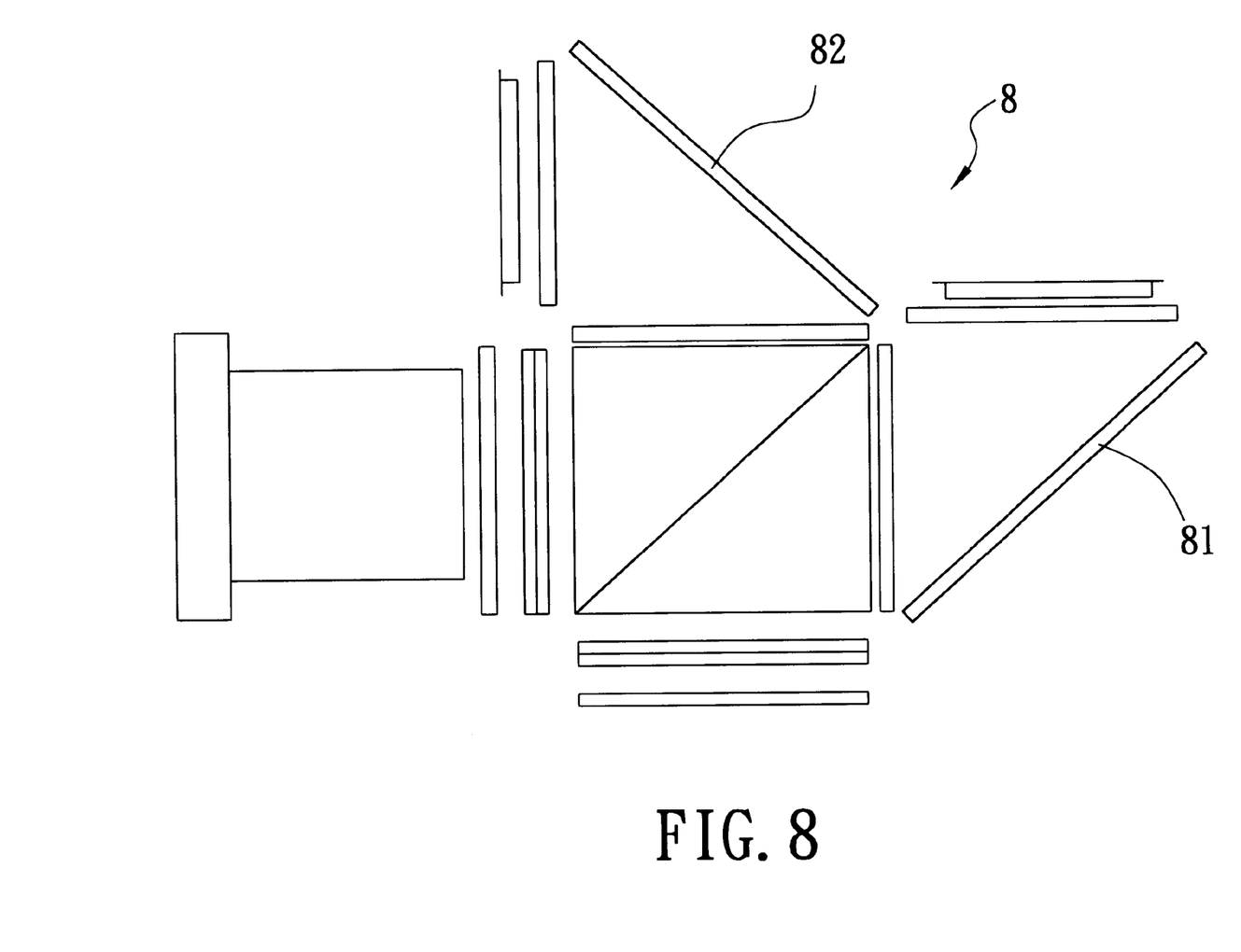
FIG. 8 is a schematic view of the seventh preferred embodiment of a projection display with two reflective light valves in accordance with this invention.

FIG. 8 illustrates the seventh preferred embodiment of a projection display 8 according to the present invention, which is also a modification of the first preferred embodiment. In this embodiment, each of the first and second dichroic beam splitters 81, 82 is formed as a flat glass panel having one side provided with a dichroic color splitting film layer. The angles of the first and second dichroic beam splitters 81, 82, and the color splitting characteristics of the dichroic color splitting film layers are similar to those of the first and second dichroic beam splitters employed in the first preferred embodiment.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A projection display comprising:
    a polarization beam splitter prism having a light input side, a first split-light side adjacent to said light input side, a second split-light side opposite to said light input side, and a light output side opposite to said first split-light side, said polarization beam splitter prism allowing light that enters said light input side and that has a first polarization state to be reflected so as to pass through said first split-light side, and further allowing light that enters said light input side and that has a second polarization state to pass directly through said second split-light side;
    a first light polarization selector disposed adjacent to said light input side, said first light polarization selector being adapted to receive an input light beam that contains first, second and third color components and to process the input light beam such that the first color component has a polarization state different from that of the second and third color components;
    a projection lens disposed adjacent to said light output side;
    a second light polarization selector disposed between said light output side and said projection lens, said second light polarization selector receiving light that exits said light output side and processing the light from said light output side such that the first, second and third color components thereof have the same polarization state prior to reaching said projection lens;
    first and second reflective light valves disposed adjacent to said first and second split-light sides, respectively, said first reflective light valve being operable so as to modulate the first color component from said polarization beam splitter prism, said second reflective light valve being operable so as to modulate the second and third color components from said polarization beam splitter prism;
    a first dichroic beam splitter disposed between said polarization beam splitter prism and said first reflective light valve for directing the first color component from said polarization beam splitter prism to said first reflective light valve, and for directing the first color component from said first reflective light valve back to said polarization beam splitter prism;
    a second dichroic beam splitter disposed between said polarization beam splitter prism and said second reflective light valve for directing the second and third color components from said polarization beam splitter prism to said second reflective light valve, and for directing the second and third color components from said second reflective light valve back to said polarization beam splitter prism;
    a color switch disposed between said polarization beam splitter prism and said second reflective light valve and operable so as to allow the color components to pass sequentially therethrough;
    a first polarizer disposed on one side of said first light polarization selector opposite to said polarization beam splitter prism; and
    a second polarizer disposed between said second light polarization selector and said projection lens.

2. The projection display of claim 1, further comprising:
    a first quarter wavelength plate disposed between said first dichroic beam splitter and said first reflective light valve; and
    a second quarter wavelength plate disposed between said second dichroic beam splitter and said second reflective light valve.

3. The projection display of claim 1, further comprising an optical path compensating plate disposed between said polarization beam splitter prism and said first dichroic beam splitter.

4. The projection display of claim 1, wherein each of said first and second dichroic beam splitters is formed as a rectangular prism that includes two right-angled triangular prisms which are bonded together.

5. The projection display of claim 1, wherein each of said first and second dichroic beam splitters is formed as a right-angled triangular prism having a light input side disposed adjacent to said polarization beam splitter prism, a light output side transverse to said light input side and disposed adjacent to the respective one of said first and second reflective light valves, and a hypotenuse side formed with a dichroic color splitting film layer.

6. The projection display of claim 1, wherein each of said first and second dichroic beam splitters is formed as a flat glass panel having one side formed with a dichroic color splitting film layer.

* * * * *